Nov. 22, 1927.
M. M. BROCKWAY
1,650,006
FOUR-WHEEL REAR DRIVE CHASSIS
Filed Dec. 22, 1926
2 Sheets-Sheet 1
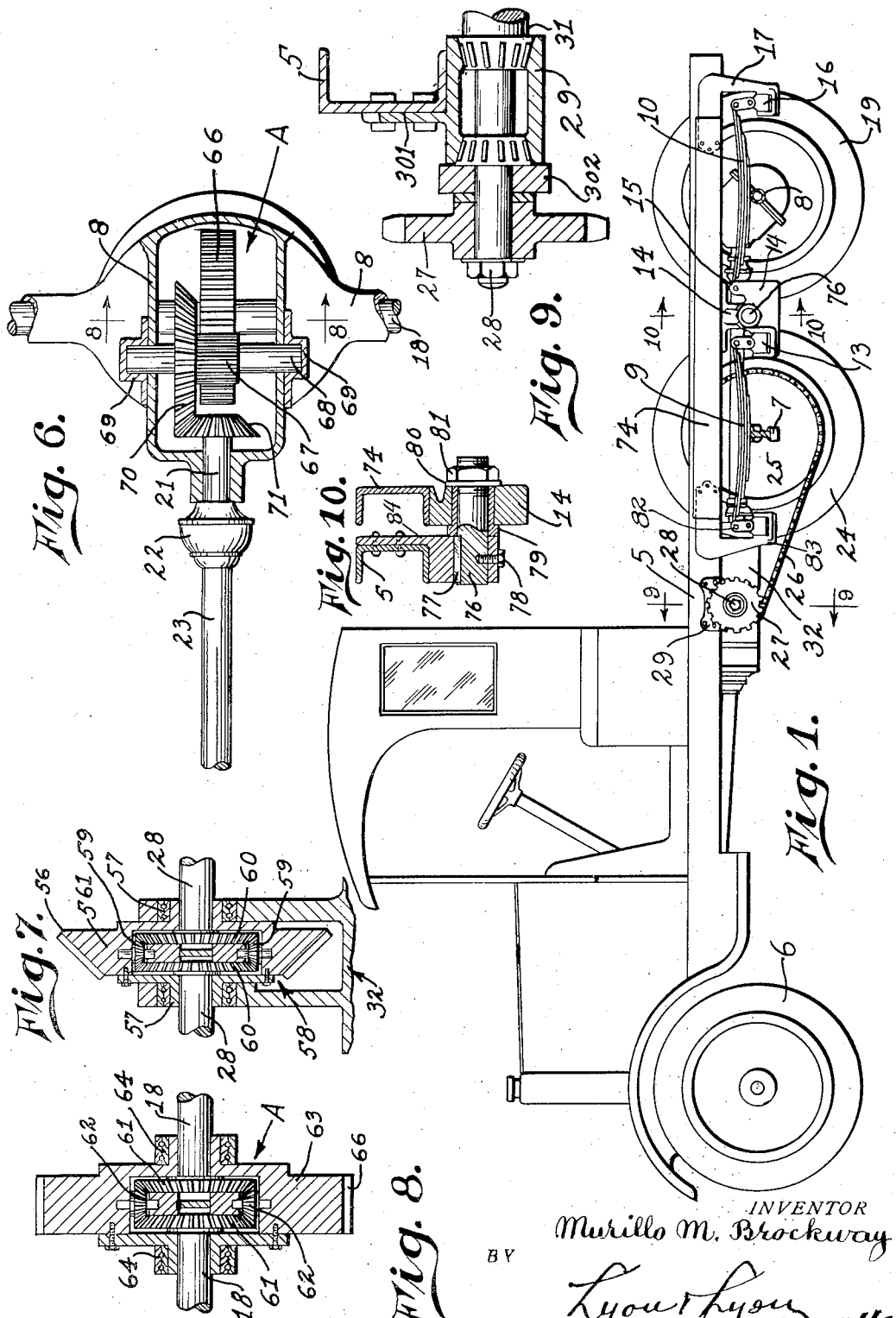
INVENTOR
Murillo M. Brockway
BY Lyon & Lyon
attys.

Nov. 22, 1927.  
M. M. BROCKWAY  
1,650,006  
FOUR-WHEEL REAR DRIVE CHASSIS  
Filed Dec. 22, 1926  
2 Sheets-Sheet 2
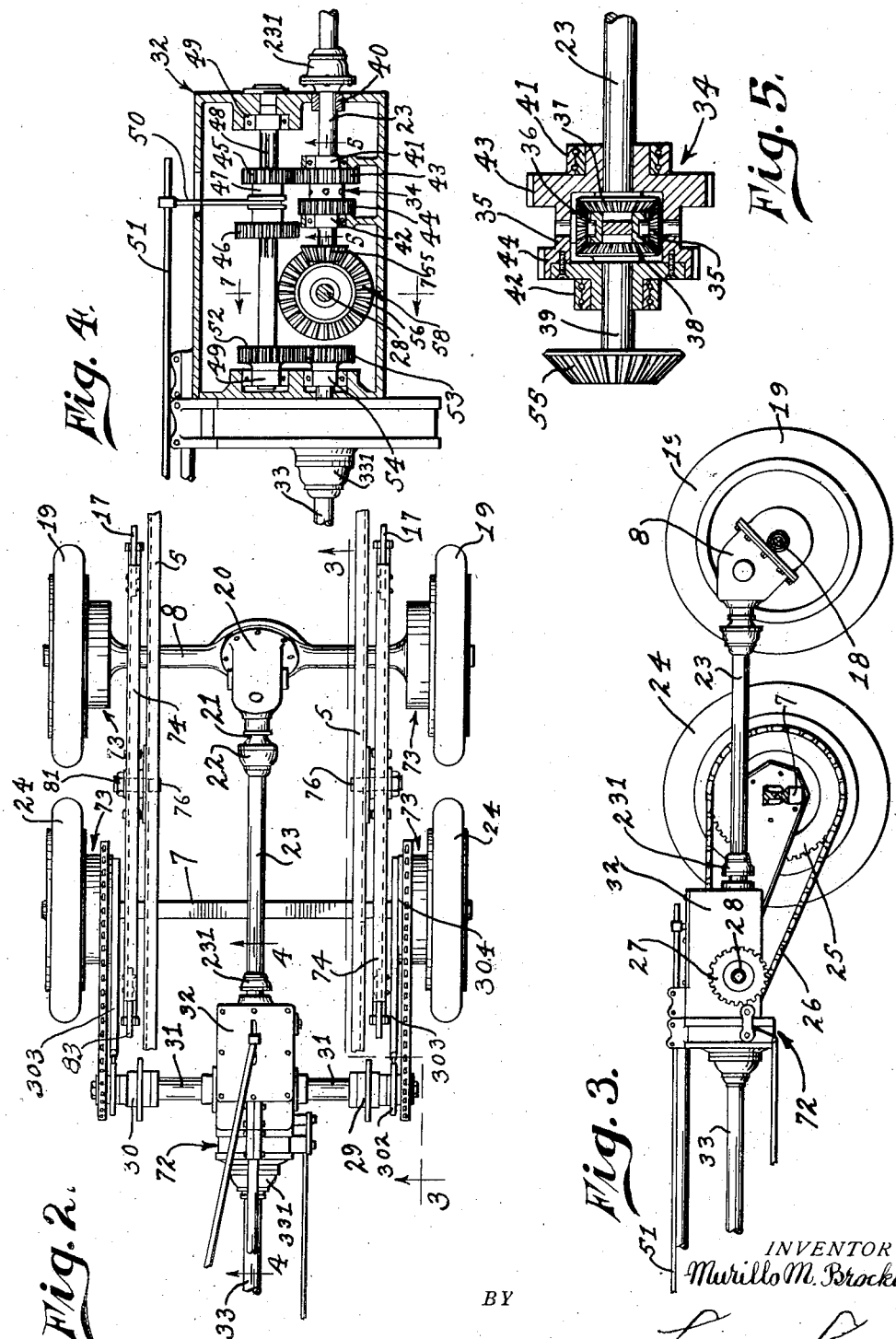
INVENTOR  
Murillo M. Brockway  
BY  
Lyon & Lyon  
attys Patented Nov. 22, 1927.

1,650,006

UNITED STATES PATENT OFFICE.

MURILLO M. BROCKWAY, OF BURBANK, CALIFORNIA.

FOUR-WHEEL REAR-DRIVE CHASSIS.

Application filed December 22, 1926. Serial No. 156,460.

This invention relates to chassis of the type employing dirigibly mounted wheels at one end and two pairs of drive wheels at the other end for effecting driving of the chassis.

There have been a large number of the six-wheel type of chassis proposed, some of them being in use. Some of these six-wheel chassis have but two of the wheels driven, whereas others have four wheels driven. Of course, this latter type is to be preferred because of the greater effective tractive effort that can be exerted. More or less difficulty is experienced in constructing a four-wheel drive chassis because each pair of drive wheels must be so mounted as to be free to move vertically with respect to the other pair of drive wheels, since the chassis does not run along a plane surface at all times but the drive wheels must accommodate themselves to the grades and inequalities of the roadways.

An object of the invention is simplicity of construction as compared with many prior known four-wheel drive six-wheel chassis.

An advantage of the invention is that service brakes may be employed on all four drive wheels and, besides, an emergency brake may be provided on the drive shaft.

By my construction I have succeeded in utilizing the shaft drive for the rear pair of drive wheels without the necessity of positioning the rear drive shaft at a comparatively great angle, as is necessary when a differential is mounted on each set of drive axles.

Another advantage of my combination is that there is economy of power because of elimination of one of the unsprung driving axles commonly found in chassis utilizing the four-wheel rear drive principle.

By this invention I am enabled to secure the advantages of the Hotchkiss type of drive and the type employing radius rods.

By this invention I am enabled to minimize the unsprung weight since two of the differentials and one of the drive shafts are supported on the chassis frame, which, of course, is spring-supported in the usual or any preferred manner.

By my construction, it is unnecessary that the axles of the two pairs of drive wheels be linked together with radius rods or solid connections, thus permitting free and independent action of each axle unit around independent centers.

My invention permits of the use of a solid type of non-rotating axle for the front or leading pair of drive wheels which are mounted upon bearings supported by said axle. This gives sufficient clearance so that the rear axle drive shaft can extend approximately horizontally over said front axle.

A further advantage of this construction is the reduction in the number of universal joints required.

Another advantage is that the brake rods for operating the brakes of one pair of drive wheels work upon a center that is independent of the center for the brake rods for operating the brakes of the other pair of drive wheels.

By my construction I secure equal load distribution on the axles of the drive wheels.

The brake on the drive shaft, in my construction, is applied ahead of the differential that connects the two pairs of drive wheels, thereby giving equal braking upon all four drive wheels with said brake.

The accompanying drawings illustrate the invention.

Figure 1 is a side elevation of a chassis constructed in accordance with the provisions of this invention, the near drive wheels being omitted.

Figure 2 is a plan view of the rear portion of the chassis, omitting a portion of the chassis frame.

Figure 3 is an elevation of Figure 2, partly in section, from the irregular line indicated by 3—3, Fig. 2.

Figure 4 is an enlarged side elevation of the forward gear train and fragments of the shafts connected thereby.

Figure 5 is an enlarged sectional elevation on the line indicated by 5—5, Fig. 4.

Figure 6 is a plan view of the rear gear train, the case therefor being shown partly in section.

Figure 7 is an enlarged sectional elevation on the line indicated by 7—7, Fig. 4.

Figure 8 is an enlarged sectional elevation on the line indicated by 8—8, Fig. 6.

Figure 9 is an enlarged sectional detail taken on the line indicated by 9—9, Figure 1.

Figure 10 is an enlarged sectional detail taken on the line 10—10, Figure 1.

The chassis frame is indicated at 5, and one end thereof is supported in the usual manner on dirigible wheels, only one of which can be seen at 6 in Fig. 1 because of the nature of the view. Near the other end of the frame 5 are spaced spring supports 7, 8, the support 7 being a solid, non-rotating axle upon which are mounted vehicle springs 9, and the support 8 being a housing for the rear axles, and on the support 8 are mounted vehicle springs 10. Each vehicle spring 9 is connected at its forward end by a shackle 82 to a bracket 83 which is connected with the chassis frame 5 and each of said springs 9 is connected at its rear end by a shackle 13 to a bracket 14 that is connected with the chassis frame. To each bracket 14 is pivoted at 15 the forward end of one of the vehicle springs 10, and each vehicle spring 10 is connected at its rear end by a shackle 16 to a bracket 17 which is connected with the chassis frame. This provides for the rear set of vehicle springs 10, a form of spring suspension used with the Hotchkiss type of drive. It is to be understood, however, that the shackles may be omitted and radius rods employed in a manner well understood in this art.

Preferably, the brackets 14, 17 are not fixed to the chassis frame but are pivotally connected thereto and to accomplish this there are provided outside of the frame 5 and extending longitudinally thereof rock members 74 which are secured in any suitable manner to the brackets 14. Each bracket 14 has a bearing 79 through which extends a stub shaft 76 secured by a key 77 and screw 78 to a bracket 84. The brackets 84 are riveted or otherwise secured to the frame 5. To retain the brackets 14 on the stub shafts 76, nuts 81 are screwed onto the outer ends of said stub shafts, there being preferably washers 80 between the nuts 81 and the bearings 79. The brackets 17, 83 are secured to the opposite ends of the members 74. From this it will be readily understood that the members 74 are free to rock about the axes of the shafts 76 when either pair of driven wheels meets with an uneven traction surface of such amplitude that compression or/and expansion of the springs 9 or/and 10 will not suffice.

Within the housing 8 are axles 18 which connect at their outer ends to the rear drive wheels 19 that are rotatably mounted, in a manner well understood in this art, on tubular end portions of the housing 8. The inner ends of the axles 18 connect with differential gearing A within the housing 8 and this gearing, in turn, is driven through any suitable reduction gearing as, for example, the bevel type, double reduction type, internal gear or worm type.

The shaft 21 for driving the differential gearing A is connected by a universal joint 22 to a drive shaft 23. This drive shaft 23 is sectional and the sections are connected by a universal joint 231.

Rotatably mounted on the axle 7 in a manner well understood in this art are forward or leading drive wheels 24 and connected with each drive wheel 24 is a sprocket 25. Each sprocket 25 is connected by a sprocket chain 26 with a sprocket 27 and the sprockets 27 are mounted on the outer ends of jack-shafts 28 rotatably supported at said outer ends in bearings 29, 30. The bearings 29, 30 are supported by a tubular housing 31 that surrounds the jack-shafts. The housing 31 is supported near its ends by brackets 301 secured to the frame 5. Loosely mounted on the end portions of the housing 31 are collars 302 which are connected by radius rods 303 to the rear brake flanges 304. The jack-shaft housing 31 projects from the opposite sides of a gear case 32 which contains a train of gears for connecting the shafts 23, 28, with a shaft 33 that is driven by a motor, not shown. The shaft 33 will preferably be connected with the motor through suitable change speed gearing, not shown, in a manner well understood in this art. The shaft 33 is in sections connected by a universal joint 331. Though the train of gearing connecting the shafts 23, 28, 33 may be of any suitable construction that will answer my purpose, said train, in this instance, is constructed as follows:

The shaft 23 is driven through differential gearing indicated in general by the character 34, said differential gearing, in this instance, comprising a spider 35 in which are rotatably mounted bevel pinions 36 that engage bevel gears 37, 38. The bevel gear 37 is fixed to the shaft 23 and the bevel gear 38 is fixed to another shaft 39. The shaft 23 turns in bearings 40, 41 in the case 32 and the shaft 39 turns in bearings 42 also mounted in the case 32. The spider 35, in this instance, may be driven at different speeds at any given speed of the shaft 33, and, for this purpose, is provided with spur gears 43, 44, of different sizes. Spur gears 45, 46, on a slidably mounted sleeve 47, may be selectively engaged with the respective gears 43, 44. The sleeve 47, in the customary manner of sleeves of this character, is splined on a shaft 48 that rotates in bearings 49 in the case 32, and the sleeve 47 is shifted by a fork 50 operated by a rod 51 which extends to within reach of the driver.

The shaft 48 is driven by a spur gear 52 mounted thereon in mesh with a spur gear 53 which is mounted on the shaft 33. In the case 32 is a bearing 54 for the shaft 33.

The shaft 39 is provided at its forward end with a bevel pinion 55 which meshes with a bevel gear 56 rotatably mounted in bearings 57 carried by the case 32.

The bevel gear 56 is formed on the spider 561 of differential gearing which is indicated in general by the character 58. In the spider 561 are rotatably mounted bevel pinions 59 which mesh with bevel gears 60 fixed to the inner ends of the respective shafts 28.

Though any suitable type of differential gearing A may be employed, that shown in detail in Figures 6 and 8 is constructed as follows:

The inner ends of the axles 18 are provided with bevel gears 61 which mesh with bevel pinions 62 carried by a spider 63. The spider 63 rotates in bearings 64 in the housing 8. The spider 63 has on its periphery a spur gear 66, whereby the differential gearing is driven. In this instance, the spur gear 66 is in mesh with a spur pinion 67 mounted on a shaft 68 that turns in bearings 69 in the housing 8.

The shaft 68 is driven by a bevel gear 70 mounted thereon in mesh with a bevel pinion 71 fixed to the rear end of the shaft 21.

If desired, a brake 72 may be applied to the shaft 33 as well as brakes 73 for the several wheels, 19, 24.

The invention operates as follows:

The shaft 33 will be driven by the motor, not shown, of the vehicle thus driving the gear 56 which, in turn, drives the shafts 28 through the differential gearing 58. The shafts 28 drive the sprockets 27 and thus transmit power to the wheels 24.

It will be seen that the differential gearing 58 is driven through the differential gearing 34 and that said differential gearing 34 also effects driving of the shaft 23 which, in turn, drives the shaft 21. Turning of the shaft 21 operates the shafts 18 through the gear train that includes the differential gearing A. Therefore, from the foregoing it will be clear that all of the power driven wheels 19, 24, can act independently when the chassis is being steered in a curved path, or when, for any other reason, one or more of the wheels should be driven at a higher speed than the others and that, because of my new combination of certain features of construction, the unsprung weight is minimized due to the fact that the differential gearings 34, 58 and the shaft 33, as well as a portion of the shaft 23, are supported on the chassis frame which, of course, is supported by the springs 9, 10.

It will be clear that, by my construction, it is not necessary to link together the two pairs of drive wheels with radius rods, springs or solid connections as in many prior four-wheel drive six and eight-wheel chassis and thus the axle units are free to move around independent centers.

I claim:

1. A four-wheel drive chassis of the character described comprising a housing, axles in the housing, wheels connected with said axles, differential gearing connecting said axles, a non-rotating axle, wheels rotatably mounted on the last-mentioned axle, a frame, resilient supports between the frame and housing and between the frame and non-rotating axle, sprockets connected with the last-mentioned wheels, jack shafts, sprockets on the jack shafts, chains connecting the first and second mentioned sprockets, a housing for the jack shafts supported by the frame, a case secured to the last mentioned housing, differential gearing mounted in the case and connecting the jack shafts, a third differential gearing connected with the first and second mentioned differential gearings, and means to operate the third differential gearing.

2. A four-wheel drive chassis of the character described comprising a frame, three differential gearings, axles connected by one of the differential gearings, a housing for said axles, wheels secured to the axles, a non-rotating axle, wheels rotatably mounted on the last mentioned axle, a frame yieldingly supported in part on the non-rotating axle and in part on the housing, jack shafts rotatably mounted on the frame and connected by a second one of the differential gearings, chain and sprocket connections between the jack shafts and the last mentioned wheels, means driven by a third one of the differential gearings to drive the first mentioned differential gearing, means to drive said third differential gearing, and means driven by the third differential gearing to drive the second differential gearing.

3. A four-wheel drive chassis of the character described comprising three differential gearings, axles connected by one of the differential gearings, a housing for said axles, wheels secured to the axles, a non-rotating axle, wheels rotatably mounted on the last mentioned axle, a frame, rock members pivotally connected with the frame and yieldingly supported in part on the non-rotating axle and in part on the housing, jack shafts rotatably mounted on the frame and connected by a second one of the differential gearings, chain and sprocket connections between the jack shafts and the last mentioned wheels, means driven by a third one of the differential gearings to drive the first mentioned differential gearing, means to drive said third differential gearing, and means driven by the third differential gearing to drive the second differential gearing.

4. A four-wheel drive chassis of the character described comprising a frame, rock members pivotally connected with the frame, yielding means supporting the opposite ends of the rock members, a wheel supporting each spring, a differential gearing connecting two of the wheels, jack shafts rotatably mounted on the frame, a second differential gearing connecting said jack shafts, driving connections between the jack shafts and the other two wheels, a third differential gearing, means driven by the third differential gearing to drive the first mentioned differential gearing, means to drive the third differential gearing, and means driven by the third differential gearing to drive the second differential gearing.

Signed at Los Angeles, Calif., this 30 day of Nov. 1926.

MURILLO M. BROCKWAY.